United States Patent
Pecen et al.

(10) Patent No.: US 7,564,815 B2
(45) Date of Patent: Jul. 21, 2009

(54) APPARATUS AND METHOD FOR PROVIDING NOTIFICATION OF ALLOCATION OF COMMUNICATION RESOURCES BY USING A TEMPORARY FLOW SET INDICATOR

(75) Inventors: Mark Pecen, Waterloo (CA); Mihal Lazaridis, Waterloo (CA); Sean Simmons, Waterloo (CA)

(73) Assignee: Research In Motion Limited, Waterloo (CA)

( * ) Notice: Subject to any disclaimer, the term of this patent is extended or adjusted under 35 U.S.C. 154(b) by 353 days.

(21) Appl. No.: 11/271,519

(22) Filed: Nov. 10, 2005

(65) Prior Publication Data

US 2007/0104135 A1     May 10, 2007

(51) Int. Cl.
    *G06F 15/16*      (2006.01)

(52) U.S. Cl. ....................... 370/329; 370/338

(58) Field of Classification Search ............... 370/329, 370/252, 319, 321, 330, 338, 345, 458
See application file for complete search history.

(56) References Cited

U.S. PATENT DOCUMENTS

| 6,895,248 | B1 | 5/2005 | Akyol |
| 2002/0114309 | A1 | 8/2002 | Chow |
| 2004/0153706 | A1* | 8/2004 | Cayla ............................. 714/4 |
| 2004/0192341 | A1* | 9/2004 | Wang et al. ............... 455/456.1 |

* cited by examiner

*Primary Examiner*—Sam Bhattacharya

(57) ABSTRACT

Apparatus and an associated method for notifying communication stations of communication allocations made to communicate data. A matrix representation is formed of communication resources that are allocated for communication of the data. The matrix representation is used to construct an assignment bit map by a bit map constructor that is representative of the allocated communication resources. And, a temporary flow set identifier generator is used to form a temporary flow set identifier. The temporary flow set identifier includes the assignment bit map as a portion thereof.

20 Claims, 3 Drawing Sheets

APPARATUS AND METHOD FOR PROVIDING NOTIFICATION OF ALLOCATION OF COMMUNICATION RESOURCES BY USING A TEMPORARY FLOW SET INDICATOR

The present invention relates generally to the communication of data pursuant to a high-speed data radio communication service, such as an Enhanced Data for GSM Evolution (EDGE) communication service. More particularly, the present invention relates to apparatus, and an associated method, by which to form an allocation message formed of a temporary flow set identifier that is communicated to a communication station to alert the communication station of the communication resource allocation, thereby to permit the communication station to operate best to receive subsequently communicated data.

BACKGROUND OF THE INVENTION

Data communication systems are sometimes defined in terms of their throughput capabilities, in part due to the significance of data throughput rates to performance of many data communication services. High-speed data communication services, historically, were performed by way of wireline communication systems. However, the rapid rate at which communication technologies have evolved has also permitted the development and deployment of radio communication systems capable of communicating data at high throughput rates. Data services that necessitate for their execution the communication of large amounts of data in short periods of time are increasingly able to be performed by way of a radio communication system that is capable of communicating the data at the high throughput rates. With further evolution of communication technologies, the need for the capability to communicate data at yet higher data throughput rates by way of radio communication systems shall likely become possible and communication services necessitating data to be communicated at such higher data throughput rates shall correspondingly become available.

Cellular communication systems are exemplary of radio communication systems that are capable of communicating data at high data rates. For instance, GSM (Global System for Mobile communications) cellular communication systems have been developed and widely deployed. Many GSM networks provide for GPRS (General Packet Radio Service) that permits communication of data at relatively high data rates. An extension to GPRS, referred to as EDGE (Enhanced Data for GSM Evolution), is presently undergoing deployment. EDGE-capable communication systems provide for communication of data at data throughput rates that are significantly higher than those achievable in GSM/GPRS-only communication systems. In spite of the improved communication capabilities of an EDGE-capable system, there is a continuing need yet further to increase the achievable data throughput rates by which data is communicated in a radio communication system.

An EDGE-capable communication system is operated in general conformity with an operating specification promulgated by a standards-setting body. The operating specification defines, amongst other things, a channel structure that defines channels on a radio air interface formed between communication stations operable in the communication system. Multiple carriers are available for use, defined sometimes logically in terms of mobile index allocation offsets. The channel structure includes frames, each of which is divided into time slots. Due to various requirements, even though frames and time slots are defined upon each of the multiple carriers that are available for use, communication resources that are allocated for the communication of data pursuant to a particular communication session are allocated upon a single carrier. Communication resources, to date, are not allocated upon multiple carriers or, more generally, across a plurality of mobile allocation index offsets. A temporary flow identifier (TFI) is conventionally formed and used in an EDGE system. A TFI is associated with a temporary block flow, data that is communicated pursuant to performance of a communication service. A TFI is defined at the network part of an EDGE-capable system. Because, conventionally, communication resource allocations are made upon only a single radio carrier or mobile allocation index offset, a TFI does not identify communication resources across a plurality of radio carriers or index offsets.

It is in light of this background information that the significant improvements of the present invention have evolved

DETAILED DESCRIPTION

Figure 1:
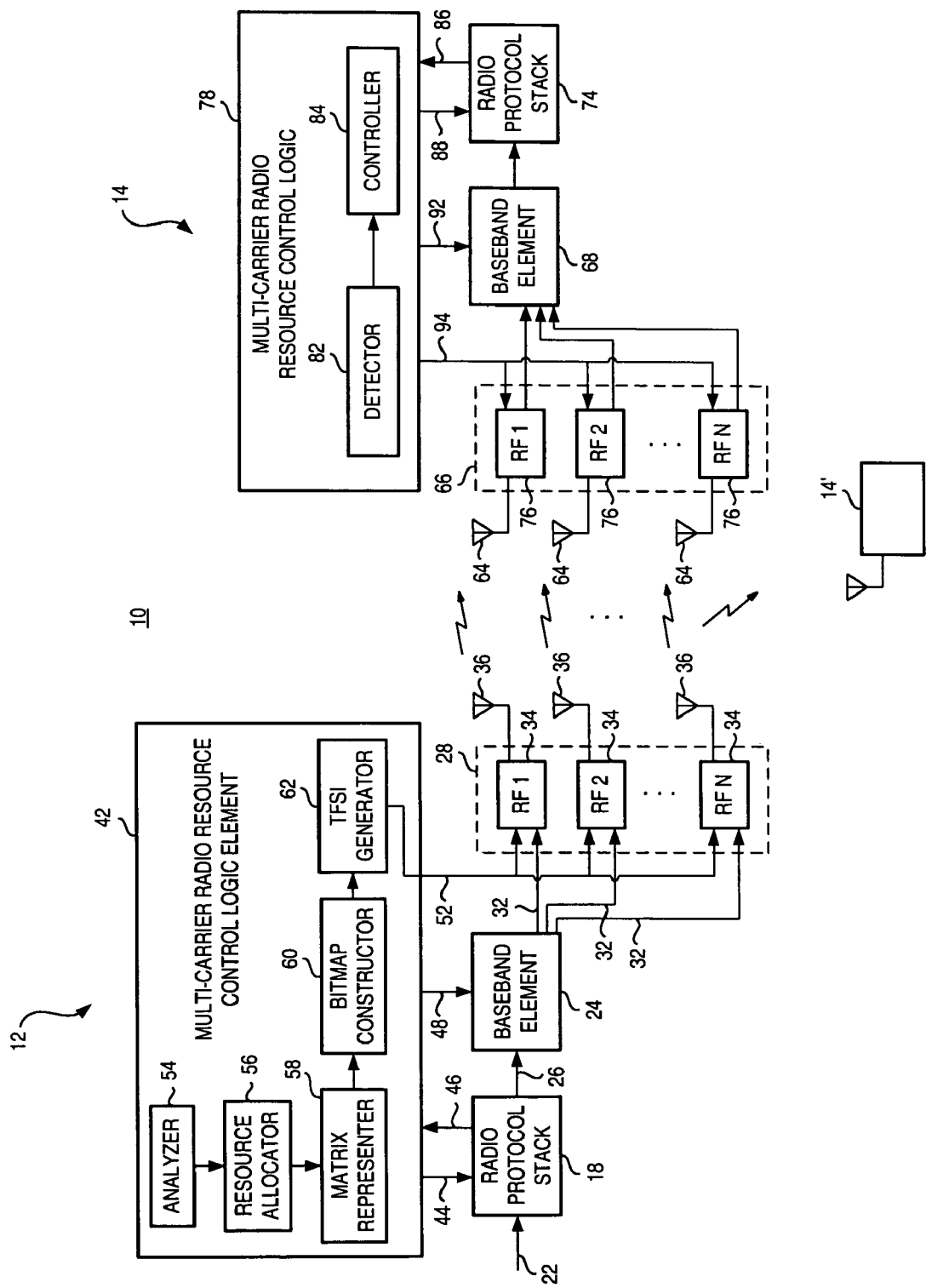
FIG. 1 illustrates a functional block diagram of an exemplary communication system that includes an embodiment of the present invention as a portion thereof.

The present invention, accordingly, advantageously provides apparatus and method for use in communication of high-speed data to perform a high-speed data radio communication service, such as EDGE (Enhanced Data for GSM Evolution) data communicated in an EDGE-capable communication system to perform a data communication service.

Through operation of an embodiment of the present invention, a resource allocation message formed of a temporary flow set identifier (TFSI) is generated, the contents of which provides notification of communication resources allocated pursuant to the communication of data, such as pursuant to the communication of EDGE data communicated to perform an EDGE communication service.

The communication resources are allocated across a plurality of radio carriers, and the allocation message forms a temporary flow set identifier (TFSI). The TFSI includes an assignment bit map that is of values that correspond to, or are otherwise representative of, a matrix representation of the communication resource allocation. By allocating the communication resources across a plurality of radio carriers, the likelihood of resource availability during any particular time slot is greater than the likelihood of a corresponding level of resources being available at a single carrier. The communication resource allocation is made of time slot allocations on different ones of the radio carriers, is represented in the form of a matrix formed of matrix elements positioned in rows and columns, the values of each matrix element used to form a bit map that populates a field of the temporary flow set identifier.

The temporary flow set identifier is communicated between communication stations that are to be parties to a communication session pursuant to which data is communicated. The temporary flow set identifier, formed at, or provided to, a first communication station is communicated to a second communication station to notify the second communication station of the communication resource allocation.

The assignment bit map contained in the TFSI is based upon a matrix representation that is, for instance, a straightforward mapping of the time slot allocations within a time frame across each of the plurality of radio carriers. Alternately, matrix manipulations are also performed to reduce the size of the matrix and, correspondingly, the size required of the matrix representation, and resultant assignment bit map of the temporary flow set identifier is also reduced.

In one aspect of the present invention, a bit map constructor is provided that, responsive to an indication of a matrix representation of the communication resource allocation, forms a first assignment bit map. The matrix representation is formed of a direct mapping, or a matrix manipulation of the direct mapping, of the communication resource allocation across the plurality of carriers during a frame, or other appropriate period. And the assignment bit map is of values corresponding to the matrix representation.

In another aspect of the present invention, a temporary flow set identifier generator receives the assignment bit map representative of the communication resource allocation and includes the values of the bit map that is generated by the TFSI generator. Values of the bit map populate a field of the temporary flow set identifier. By populating the field of the TFSI with such values, the temporary flow set identifier forms a notification message that is capable of providing notification of the communication resource allocation made to communicate data.

In another aspect of the present invention, the resource allocations are dynamically made at selected intervals. Successive temporary flow set identifiers, forming reallocation messages that reallocate earlier allocations of communication resources, are formed and used to provide notification of the resource allocations. When the bit map constructor receives an updated, or other subsequent, indication of resource allocation, the bit map constructor forms an updated bit map construction representative of the communication resource allocation and provides the updated bit map construction, or indications of changes to a prior bit map construction, to the TFSI generator. The temporary flow set identifier generator uses the updated information provided thereto to populate a field of a new TFSI. The TFSI forms a notification message that provides notification of reallocation of the communication resources, forming alternately a new temporary flow set identifier or an update of an earlier temporary flow set identifier.

In another aspect of the present invention, the temporary flow set identifier, once generated, is communicated, by way of a radio air interface, from a first communication station to a second communication station. The second communication station, a receiving station, includes a detector that detects the contents of the temporary flow set identifier and the values of the assignment bit map representative of the communication resource allocation. Values of the bit map are extracted and provided to a controller. The controller controls operation of the receiving station so that the receiving station is operable to receive data subsequently communicated using the communication resources allocated for the communication of the data.

The temporary flow set identifier generated by the message generator selectably includes further information, such as information identifying a starting period at which the allocated communication resources shall be available for the communication of the data. The indication is, alternately, an absolute indication or an implicit indication. The temporary flow set identifier generated by the TFSI generator further selectably includes an indication of the duration period during which the communication resources identified in the allocation message shall be allocated. The duration period is, e.g., time-based, represented in terms of a frame duration length.

In one implementation, the resource allocation is made at a network part of an EDGE-capable radio data communication system for the communication of EDGE data by the network part to a mobile station or, in a multicast, to a group of mobile stations. The communication resources are allocated across a plurality of radio carriers, identified, e.g., in terms of mobile allocation index offsets (MAIOs).

By forming a temporary flow set identifier that includes a bit map representative of the communication resource allocation across the plurality of radio carriers and using the matrix representation in a TFSI, a notification of the resource allocation is readily provided to a remote communication station that is to be party to a communication session during which data is to be communicated.

In these and other aspects, therefore, apparatus and associated methodology is provided for providing notification of a communication resource allocation pursuant to communication of a temporary flow set. A bit map constructor is adapted at least to receive an indication of the communication resource allocation made for the communication of the data pursuant to the temporary flow set. The bit map constructor is configured to construct a first assignment bit map of the communication resource allocation. The communication resource allocation is made responsive to a matrix representation of the resource allocation. A temporary flow set identifier generator is adapted to receive the bit map made by the bit map constructor. The generator is configured to generate temporary flow set identifier that includes the assignment bit map. The TFSI is for communication to provide the notification of the communication resource allocation pursuant to the communication of the data.

In these and other aspects, further apparatus and methodology is provided for a communication station operable pursuant to communication of data in a communication scheme that provides for mobile allocation index offset. A detector is configured to detect a temporary flow set identifier delivered to the communication station. The temporary flow set identifier includes a bit map representative of a communication resource allocation. A controller is adapted to receive an indication of detection made by the detector. The controller is configured to control operation of the communication station responsive to detections made by the detector.

With these and other aspects in mind, reference is first made to FIG. 1 that illustrates a communication system, shown generally at 10, in which an embodiment of the present invention is operable. The communication system, in its exemplary implementation, forms a data radio communication system that operates in general conformity with the operating specification of a GSM/GPRS/EDGE (Global System for Mobile communications/General Packet Radio Service/Enhanced Data for GSM Evolution) communication scheme. In other implementations, the communication system is analogously representative of communication systems operable pursuant to other communication schemes. Accordingly, while the following description shall describe exemplary operation of the communication system with respect to its exemplary implementation, the teachings of the present invention are analogously applicable for implementation in other types of communication systems.

The communication system 10 is a multi-user communication system of which a set of communication stations, communication station 12 and communication station 14, are shown in the figure. The communication station 12 is representative of a network station, formed of elements of a network part of the communication system. The communication system 12 shall, at times, be referred to herein as a network station 12. The communication station 14 is representative of a mobile station, and the communication station 14 shall, at times, herein be referred to as a mobile station 14. Either of the communication stations 12 and 14 is capable of generating and communicating EDGE data pursuant to performance of an EDGE data service. Operation shall be described with respect to communication of data in a down-link direction, that is, from the network station to the mobile station. Operation in an uplink direction, i.e., from the mobile station to the network station is analogously carried out.

A communication station 14' is also shown in FIG. 1. The communication station 14' represents another mobile station that is capable of communicating EDGE data with the network station 12. Separate point-to-point communication sessions as well as multicast communications in which, e.g., data is communicated by the network station to both the mobile stations 14 and 14' are provided.

Amongst the protocols set forth in the EDGE/GPRS/GSM operating specification are definitions of an EDGE channel structure. The EDGE channel structure is a TDMA (Time Division Multiple Access) scheme in which groups of eight time slots form a frame. Communication resource allocations are made by allocating time slots within a frame to communicate data during the allocated time slot or time slots. A maximum transmission rate of 59.2 kb/s per time slot is presently provided in a promulgation of the operating specification. When a communication service is to be performed, communication resources, i.e., time slots within frames define upon the carriers available for communication, are allocated for the communication of the EDGE data.

As each frame includes eight time slots, at least theoretically, all eight time slots of the frame can be allocated to a single communication session, i.e., for the communication of data between a set of communication stations, such as the communication stations 12 and 14, to perform a communication service. A maximum, theoretical transmission rate of 473.6 kb/s (8* 59.2 kb/s=473.6 kb/s) is available per frame.

In actual practice, however, allocation of all, or many, of the time slots per frame on a single carrier is unachievable. Various operating requirements of the EDGE/GPRS/GSM system require that a mobile station make various measurements during its operation. Measurements must be made, e.g., upon signals broadcast in cells adjacent to the cell in which the mobile station is positioned. The operating specifications TS 45.008 [5] and TS 45.002 [2], Annex B specify and define certain of the measurements. Time slots are also required to be allocated to perform other data and traffic services. Competition for the communication resources limits the availability of time slots, particularly contiguous time slots that are available to be allocated to effectuate a communication service.

For example, if there is a sixty percent probability of availability of a single time slot for assignment, the statistical probability of six contiguous time slots on a single carrier, i.e., a single mobile allocation index offset, within a frame being available is only 4.67 percent. The probability of all eight contiguous time slots of a frame on a single carrier being available drops to 1.68 percent. Even if limitations due to the need of a mobile station to make measurements is disregarded, there is, therefore, a statistically small likelihood that multiple, contiguous time slots would be available on a single carrier for allocation to communicate data pursuant to a particular EDGE communication service.

Contiguous time slots, or at least other additional time slots, are sometimes available on other radio carriers. By permitting the allocation of time slots across a plurality of radio carriers for the communication of data pursuant to a single communication session, an increased data throughput rate is achievable. When communication resources are allocated across a plurality of carriers, however, the communication stations that are parties to a communication session must be operable in manners to successfully communicate the data. All of the communication stations that are parties to the communication of the data must, therefore, have knowledge of the communication resource allocations made across the plurality of radio carriers. Pursuant to operation of an embodiment of the present invention, a manner is provided by which to make notification of the communication resource allocations across the radio carriers so that the communication stations that are parties to a communication session are notified of the communication resource allocation.

The communication stations 12 and 14 are functionally represented in FIG. 1, formed of functional elements that are implementable in any desired manner. Additionally, the functions performed by the various functional elements need not necessarily be positioned together at a common physical entity but, instead, can be distributed across several physical entities. The elements shown to form portions of the network station 12, e.g., need not be positioned at a single physical entity but rather can be distributed across several physical entities, such as, for instance, across a base station controller and a base transceiver station of the network.

The transmit chain portion of the network station is represented in FIG. 1 and is here shown to include a radio protocol stack 18 to which user application data is applied by way of the line 22. The application data is for communication to one or more mobile stations pursuant to one or more EDGE communication sessions. The radio protocol stack includes various logical layers including a radio resource management (RRM) layer. The network station also includes a baseband element 24 to which data is provided, here indicated by way of the lines 26. The baseband element performs various baseband operations, such as baseband processing, modulation, and channel coding.

The network station also includes a radio element 28. The data, once operated upon by the baseband element, is provided to the radio element, here indicated by way of the lines 32. The radio element is formed, at least functionally, of radio frequency transceiver front ends 34. N radio transceivers are shown in FIG. 1. Each of the radio transceivers is coupled to an antenna transducer 36. The transducers transduce the data into electromagnetic form for communication to one or more mobile stations 14.

The network station 12, pursuant to an embodiment of the present invention, also includes a multi-carrier radio resource control logic element 42. The element 42 is functionally coupled to the radio protocol stack 18, here indicated by way of the lines 44 and 46. The logic element is also coupled to the baseband element 24, here indicated by way of the lines 48. And, the logic element is further coupled to the radio element 28, here indicated by way of the lines 52. The logic element performs various functions and, in the exemplary implementation, is embodied at a radio resource management logical layer.

The logic element is here shown to include an analyzer 54, a resource allocator 56, a bit map constructor 60, and a temporary flow set identifier generator 62. The functions performed by the parts of the logic element 42 are carried out in any desired manner, such as, for example, by algorithms executable by processing circuitry.

The analyzer 54 receives indications of the data that is to be communicated by the network station to a mobile station pursuant to performance of a communication service during a communication session. In a multicast service, the data is communicated to a group of mobile stations. The indication of the characteristic includes, e.g., the amount of data that is to be communicated, within what period of time the data must be communicated, or additional indicia that, when analyzed by the analyzer, permits the communication requirements to communicate the data to be analyzed appropriately. Indications of the results of the analysis made by the analyzer 54 are provided to the resource allocator 56.

The resource allocator 56, responsive to the results of the analysis performed by the analyzer, allocates communication resources across a plurality of radio carriers or mobile allocation index offsets. In the exemplary implementation, a mobile allocation index offset and a time slot pair is provided for each of the allocations made by the allocator. Resources are signable on available time slots on different ones of the plurality of radio carriers or otherwise associated with the mobile allocation index offsets. The number of radio carriers that are available across which allocations can be made is dependent upon various factors, including the capabilities of the communication stations that are to be parties of the communication of the data. That is to say, for an allocation to be permitted, the communication stations must be capable of communicating at the frequency of the associated radio carrier. Allocations are further dependent upon additional factors, e.g., resource availability, the indications of which are also applied to the radio resource control logic 42.

The resource allocator 56 generates, or causes to be generated, control messages that are provided to the radio protocol stack, the baseband element, and the RF element to control their operation responsive to the allocation of resources made by the allocator.

An indication of the allocated resources is provided to a matrix representer 58. The matrix representer operates to represent the resources allocated for the communication of the data in matrix form. And, the matrix representation, once formed, is provided to the bit map constructor 60. The bit map constructor 60 operates to construct an assignment bit map of values corresponding to, or otherwise representative of, the matrix representation of the allocated communication resources. And, once constructed, the assignment bit map is provided to a temporary flow set identifier generator 62. The generator 62 operates to generate a temporary flow set identifier that includes the values of the assignment bit map formed by the bit map constructor 60. Here, the temporary flow set identifier forms an extension to a temporary flow identifier conventionally utilized in that the TFSI also includes the assignment bit map identifying the communication resource allocation across the plurality of radio carriers.

Once generated, the temporary flow set identifier is provided one or more of the RF transceiver front ends 34 of the RF element 28. The RF transceivers communicate the temporary flow set identifier to the mobile station to inform the mobile station of the allocated resources for the communication of data, i.e., the temporary block flow.

The receive chain portion of the mobile station 14 is shown in FIG. 1 to include structure analogous to the structure of the network station. The receive chain portion operates analogous to, but reverse to that of, the corresponding parts of the transmit chain portion of the network station.

Here, the mobile station 14 is illustrated to include an antenna transducer 64, an RF element 66, a baseband element 68, and a radio protocol stack 74. The RF element includes a plurality of transceiver front ends 76 with different ones of the transceivers being operable at different carrier frequencies.

The mobile station includes a multi-carrier radio resource control logic element 78, also of an embodiment of the present invention. The element 78 includes a detector 82 and a controller 84. The radio resource control logic element is coupled, at least functionally, to the radio protocol stack, here indicated by way of the lines 86 and 88, to the baseband element 92, and to the RF transceiver front ends of the RF element by way of the lines 94.

The detector 82 operates to detect the temporary flow set identifier sent by the network station to the mobile station and received at the RF element. The detector operates to extract values contained in the temporary flow set identifier, or otherwise operates to identify the communication resources to be allocated for the communication of the data, thereby to provide notification to the mobile station of the allocated resources. Detections made by the detector are provided to the controller 84. The controller operates to control operation of the mobile station so that the mobile station receives, and operates upon, data of the temporary block flow that is communicated during a communication session. The controller controls operation, for instance, of various elements of the mobile station to ensure that the elements are operable at the proper times to receive the data communicated upon the different carriers.

Figure 2:
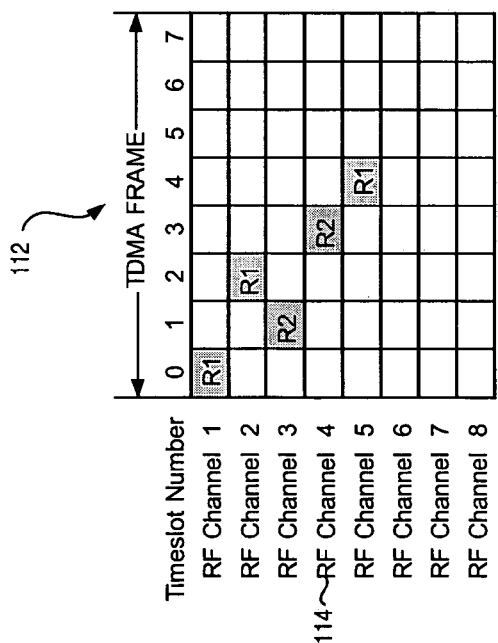
FIG. 2 illustrates a pictorial representation of exemplary operation of an embodiment of the present invention that forms part of the communication system shown in FIG. 1.
Figure 2:
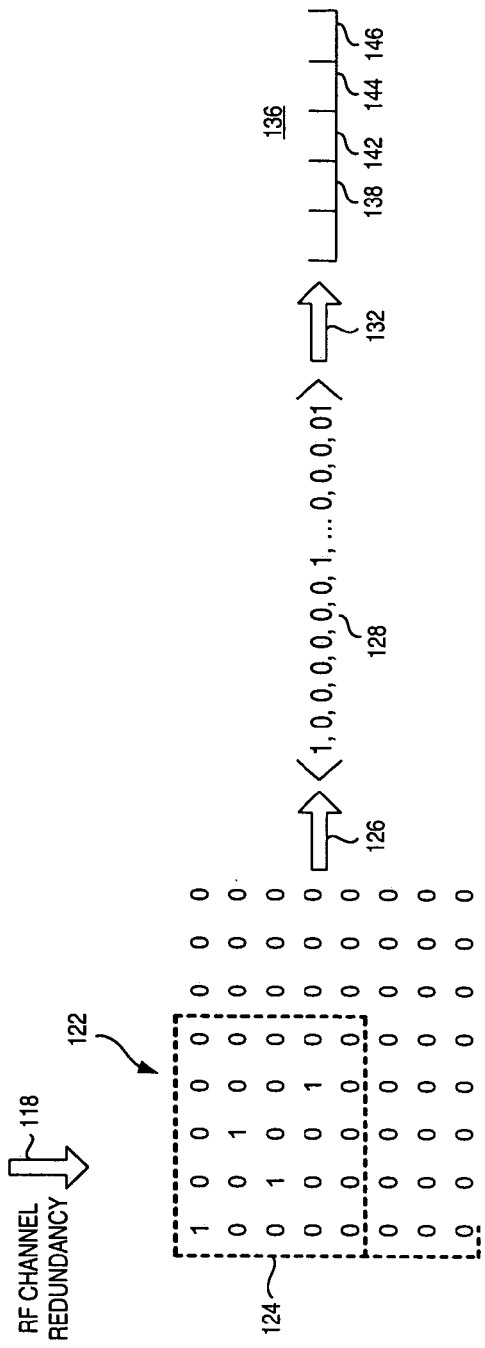

FIG. 2 illustrates a representation, shown generally at 108, that pictorially shows exemplary operation of the multi-carrier radio resource control logic element 42 that forms a portion of the communication system 10 shown in FIG. 1. An exemplary resource allocation is indicated at the left most side part (as shown) of the representation 108. A single TDMA (Time Division Multiple Access) frame 112 is shown across a plurality of RF carriers 114, designated as RF channels 1-8. Channel allocations are indicated by R1 and R2 at five contiguous time slots on different ones of the carriers, designated as channels 1-5.

Mapping, indicated by the arrow 118, is performed to create, first, 8×8 matrix 122. The matrix 122 shows a logical "1" when a resource allocation is made during a time slot upon a carrier and a logical "0" if no allocation is made during the corresponding time slot. A sub-matrix 124 is also shown in FIG. 2, here formed of rows and columns that include a logical "1" value. The sub-matrix 124 is representative generally of a manipulated matrix formable by the matrix representer as a result of matrix manipulation of the larger matrix 122. In other exemplary allocations of communication resources and other exemplary implementations, other types of matrix manipulations are performed to form a matrix of reduced size or form. Time slots and RF channel redundancies are removed in the exemplary example.

Indications of the matrix representation are provided, here indicated by way of the arrow 126, to the bit map constructor 60 (shown in FIG. 1) that operates to construct a bit map 128. The bit map corresponds in values to the values of the matrix representation 124. If the bit map is formed without using the matrix manipulation, the bit map would correspond to the matrix representation 122.

Thereafter, and as indicated by the arrow 132, the bit map is provided to the temporary flow set identifier generator 62 (shown in FIG. 1) that operates to generate a temporary flow set identifier 136. The temporary flow set identifier is an extension to a conventional temporary flow identifier, a temporary field 138 of which is shown to form part of the TFSI. The temporary flow set identifier also includes the values of the bit map 128 in an extension field 142 thereof.

In a further implementation, the temporary flow set identifier includes additional fields populated with additional information, such as the starting time, indicated by the field 144 and an indication of the validity period, indicated by the field 146, as well as other information, as appropriate. In the exemplary implementation, the starting time is an absolute starting time, e.g., identified explicitly, or an implicit starting time, identified in terms of another event. For example, the starting time is identified by an absolute frame number (AFN) or an indication of a starting time based upon another event, e.g., thirteen TDMA frames subsequent to a next slow associated control channel (SACCH) block, as defined in the aforementioned operating specification. Additionally, the indication of the validity period, in an exemplary implementation, forms a time or number of frames during which the resource allocation assignment remains valid.

A separate TFSI is associated with each separate temporary block flow. Multiple temporary flow set identifiers are formed when multiple temporary block flows are communicated.

In exemplary operation, the communication resources allocated to a particular communication service are updated, and, through operation of the elements of the control logic element, new, or updated, temporary flow set identifiers are generated and caused to be communicated. The temporary flow set identifiers, when generated, are, in the exemplary implementation, communicated upon an overhead broadcast channel, such as a packet broadcast control channel (PB-CCH). The updated, or modified, TFSIs are communicated, e.g., during an idle mode or during downlink packet transfer.

Figure 3:
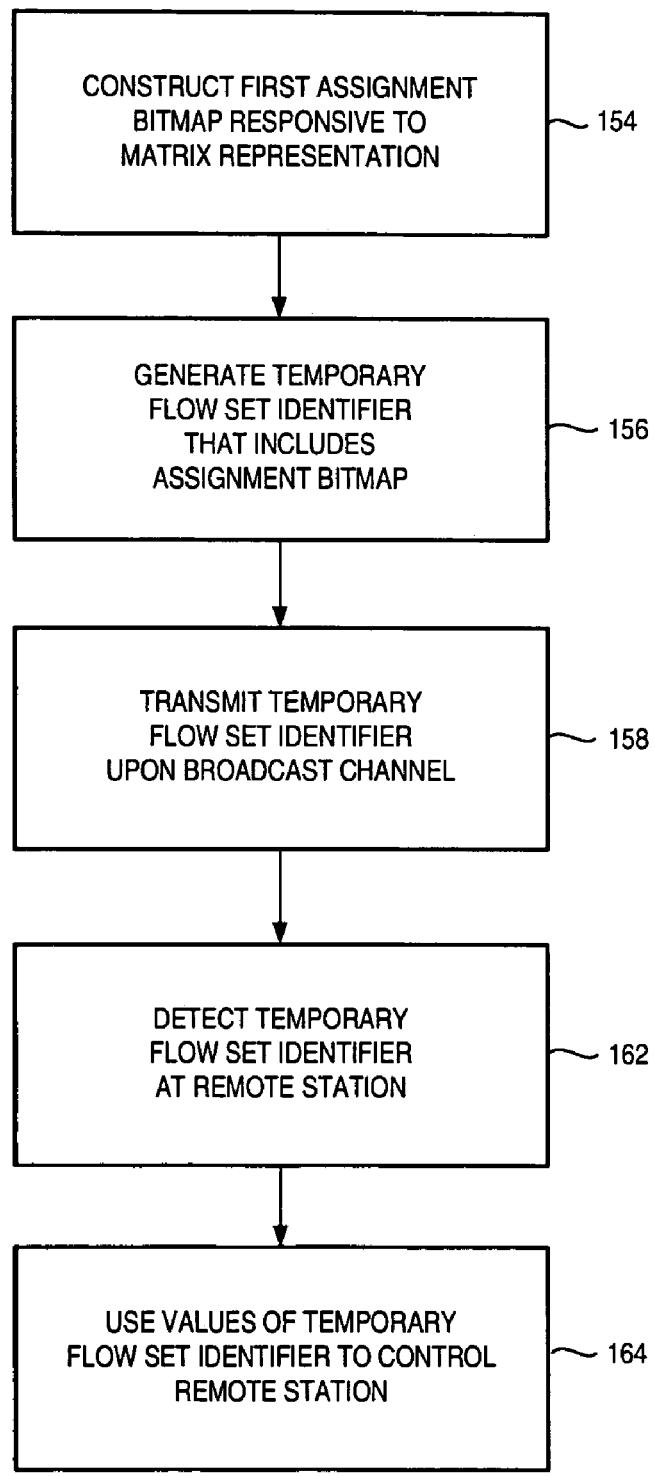
FIG. 3 illustrates a method flow diagram listing the method of operation of an embodiment of the present invention.

FIG. 3 illustrates a method flow diagram, shown generally at 152, representative of the method of operation of an embodiment of the present invention. The method provides notification of a first communication resource allocation for communication of data pursuant to a first temporary flow set.

First, and as indicated by the block 154, a first assignment bit map is constructed responsive to a matrix representation of the communication resource allocation. Then, and as indicated by the block 156, a first temporary flow set identifier is generated that includes a first assignment bit map. The first temporary flow set identifier is for communication to provide the notification of the communication resource allocation for the communication of the data pursuant to the first temporary flow set.

Thereafter, and as indicated by the block 158, the temporary flow set identifier is transmitted upon an overhead broadcast channel to a remote station. And, as indicated by the block 162, the temporary flow set identifier is detected at the remote station. Thereafter, and as indicated by the block 164, the values of the temporary flow set identifier are used to control operation of the remote station.

Thereby, through transmission of the temporary flow set identifier that includes the assignment bit map representative of communication resource allocations made to communicate data, the communication stations that are parties to a communication session are notified of the allocation of the communication resources.

The previous descriptions are of preferred examples for implementing the invention, and the scope of the invention should not necessarily be limited by this description. The scope of the present invention is defined by the following claims.

What is claimed is:

1. Apparatus for providing notification of an assignable communication resource allocation for communication of data in a multi-carrier communication system, said apparatus comprising:

a bit map constructor adapted to receive a representation of the assignable communication resource allocation made for the communication of data during a communication session in the communication system, said bit map constructor configured to construct the at least one assignment bit map during said communication session; and a temporary flow set identifier generator adapted to receive the at least one constructed assignment bit map, said temporary flow set identifier generator configured to generate a first corresponding temporary flow set identifier, the first temporary flow set identifier including the at least one assignment bit map, the temporary flow set identifier for communication during the communication session to provide the notification of the assignable communication resource allocation re-allocation during said communication session, for the communication of the data.

2. The apparatus of claim 1 further for providing notification of a second assignable communication resource allocation during said communication session for communication of data, said bit map constructor further adapted to receive a second representation of the second communication resource allocation said bit map constructor further configured to construct a second assignment bit map.

3. The apparatus of claim 2 wherein said temporary flow set identifier generator is further configured to generate a second temporary flow set identifier including the second assignment bit map, the second temporary flow set identifier for communication to provide the notification of the second assignable communication resource allocation.

4. The apparatus of claim 1 wherein the first temporary flow set identifier comprises an extension to a temporary flow identifier.

5. The apparatus of claim 1 wherein the data is communicated pursuant to a multicast communication service, the first temporary flow set identifier providing the notification of the first assignable communication resource allocation for the multicast communication service.

6. The apparatus of claim 1 wherein the first temporary flow set identifier further comprises a starting indicia identifying when the first assignable communication resource allocation commences.

7. The apparatus of claim 6 wherein the starting indicia comprises an implicit starting indicia implicitly identifying when the first assignable communication resource allocation commences.

8. The apparatus of claim 1 further comprising a transmitter adapted to receive the first temporary flow set identifier, said transmitter configured to transmit the first temporary flow set identifier upon an overhead broadcast channel.

9. The apparatus of claim 8 wherein the overhead broadcast control channel upon which said transmitter transmits the first temporary flow set identifier comprises a packet broadcast control channel.

10. The apparatus of claim 1 wherein said temporary flow set identifier generator is further configured to generate the temporary flow set identifier at selected intervals.

11. The apparatus of claim 10 wherein the temporary flow set identifier, when generated at a subsequent selected interval, comprises an updated first temporary flow set identifier.

12. Apparatus for receiving notification of an assignable communication resource allocation in a communication station operable pursuant to communication of data in a multi-carrier communication system, said apparatus comprising:

a detector configured to detect a temporary flow set identifier delivered to the communication station during a communication session with the communication station, the temporary flow set identifier including at least one assignment bit map, the at least one assignment bit map representative of a first assignable communication resource allocation re-allocation during-the communication session; and a controller adapted to receive an indication of detection made by said detector, said controller configured to control operation of the communication station responsive to detections made by said detector.

13. The apparatus of claim 12 wherein said detector is further configured to detect an update of the temporary flow set identifier delivered to the communication station, the update to the temporary flow set identifier including at least an update to a first assignment bit map.

14. A method for providing notification of an assignable communication resource allocation for communication of data in a multi-carrier communication system, said method comprising the operations of:

constructing at least one assignment bit map during a communication session, responsive to the at least one assignable communication resource allocation;

generating during the communication session, at least one temporary flow set identifier including the at least one assignment bit map, the first at least one temporary flow set identifier for communication during the communication session to provide notification of the assignable communication resource allocation re-allocation during the communication session, for the communication of the data pursuant to the at least one temporary flow set.

15. The method of claim 14 further comprising the operation of transmitting the first temporary flow set identifier upon an overhead broadcast channel.

16. The method of claim 15 wherein the overhead broadcast channel comprises a packet broadcast control channel.

17. The method of claim 15 wherein the first temporary flow set identifier generated during said operation of generating further comprises a staffing indicia identifying when the first assignable communication resource allocation commences.

18. The method of claim 15 wherein the first temporary flow set identifier transmitted during said operation of transmitting is transmitted to a remote station.

19. The method of claim 18 further comprising the operation, at the remote station, of detecting delivery of the first temporary flow set identifier.

20. The method of claim 19 further comprising the operation of controlling operation of the remote station responsive to the first temporary flow set identifier.

* * * * *